United States Patent
Smith et al.

(10) Patent No.: US 7,309,526 B2
(45) Date of Patent: Dec. 18, 2007

(54) DIAMOND LIKE CARBON COATING ON NANOFILLERS

(75) Inventors: James David Blackhall Smith, Monroeville, PA (US); Gary Stevens, Surrey (GB); John William Wood, Winter Springs, FL (US)

(73) Assignee: Siemens Power Generation, Inc., Orlando, FL (US)

( * ) Notice: Subject to any disclaimer, the term of this patent is extended or adjusted under 35 U.S.C. 154(b) by 0 days.

(21) Appl. No.: 11/132,802

(22) Filed: May 19, 2005

(65) Prior Publication Data

US 2005/0276977 A1    Dec. 15, 2005

Related U.S. Application Data

(60) Provisional application No. 60/580,023, filed on Jun. 15, 2004.

(51) Int. Cl.
*B32B 5/16* (2006.01)
(52) U.S. Cl. ............ 428/403; 428/407; 428/323; 428/328; 428/329; 428/331
(58) Field of Classification Search .......... 428/403, 428/407, 323, 328, 329, 331
See application file for complete search history.

(56) References Cited

U.S. PATENT DOCUMENTS

| | | | |
|---|---|---|---|
| 5,466,431 A * | 11/1995 | Dorfman et al. ............ 423/446 |
| 5,578,901 A * | 11/1996 | Blanchet-Fincher et al. ..... 313/496 |
| 5,780,119 A | 7/1998 | Dearnaley et al. |
| 5,904,984 A | 5/1999 | Smith et al. |
| 6,015,597 A * | 1/2000 | David ................. 427/577 |
| 6,103,382 A | 8/2000 | Smith et al. |
| 6,190,775 B1 | 2/2001 | Smith et al. |
| 6,238,790 B1 | 5/2001 | Smith et al. |
| 6,261,424 B1 * | 7/2001 | Goncharenko et al. 204/192.38 |
| 6,265,068 B1 * | 7/2001 | David et al. ............. 428/403 |
| 6,432,537 B1 * | 8/2002 | Devlin et al. ............. 428/408 |
| 6,548,172 B2 * | 4/2003 | David et al. ............. 428/403 |
| 6,882,094 B2 * | 4/2005 | Dimitrijevic et al. ... 313/346 R |

FOREIGN PATENT DOCUMENTS

| WO | WO 00/56127 A1 | 9/2000 |
|---|---|---|
| WO | WO 2004/052999 A2 | 6/2004 |

OTHER PUBLICATIONS

Bekaert, "Coating Definitions", 2004.*

* cited by examiner

Primary Examiner—H. T Le

(57) ABSTRACT

In one embodiment the present invention provides for a diamond like coating on small particles. This comprises small particles 10 in the size range of approximately 1-1000 nm and a diamond like coating on the small particles. The diamond like coating is distributed over approximately 50-100% of the surface of the small particles and the diamond like coating is one micron or less in thickness. These small particles then may be applied to materials such as resins 12 and insulating tapes.

13 Claims, 1 Drawing Sheet

DIAMOND LIKE CARBON COATING ON NANOFILLERS

CROSS-REFERENCE TO RELATED APPLICATIONS

This application claims priority to U.S. provisional 60/580,023, filed Jun. 15, 2004, by Smith, et al., which is incorporated herein by reference.

FIELD OF THE INVENTION

The field of the invention relates to the surface coating nano-sized particles with diamond like carbon coatings.

BACKGROUND OF THE INVENTION

With the use of any form of electrical appliance, there is a need to electrically insulate conductors. With the push to continuously reduce the size and to streamline all electrical and electronic systems there is a corresponding need to find better and more compact insulators and insulation systems.

Good electrical insulators, by their very nature, also tend to be good thermal insulators, which is undesirable. Thermal insulating behavior, particularly for air-cooled electrical equipment and components, reduces the efficiency and durability of the components as well as the equipment as a whole. It is desirable to produce electrical insulation systems having maximum electrical insulation and minimal thermal insulation characteristics.

Though many factors affect the art of electrical insulation, the field would benefit even more from the ability to transfer heat, without reducing other desired physical characteristics of the insulators. What is needed is improved electrical insulation materials that have a thermal conductivity higher than that of conventional materials, but that does not compromise the electrical insulation and other performance factors including structural integrity.

Electrical insulation often appears in the form of tapes, which themselves have various layers. Common to these types of tapes is a paper layer that is bonded at an interface to a fiber layer, both layers tending to be impregnated with a resin. The paper layer will be composed of materials that are highly electrically insulating, such as mica. Improvements to mica tapes include catalyzed mica tapes as taught in U.S. Pat. No. 6,103,882. If the thermal conductivity of the paper, independent from or in conjunction with its use in a tape, can be improved then electrical system will see a marked improvement. Other problems with the prior art also exist, some of which will be apparent upon further reading.

SUMMARY OF THE INVENTION

With the foregoing in mind, methods and apparatuses consistent with the present invention, which includes putting thin diamond like coatings on small particles. The particles are generally in the nano-sized range, but may be as large as a micro-sized particle. The particles themselves can be of thermally conductive materials, but need not be. By adding the diamond like carbon coating, the particles will be able to better conduct heat, while maintaining or even enhancing other physical properties, such as dielectric and physical strength. These particles then may be used with resins and insulating tapes.

These and other objects, features, and advantages in accordance with the present invention are provided particular embodiments by providing for a diamond like carbon coating on small particles. This comprises small particles in the size range of approximately 1-1000 nm and a diamond like carbon coating on the small particles. The diamond like carbon coating is distributed over approximately 50-100% of the surface of the small particles and the diamond like carbon coating is typically one micron or less in thickness, but may be greater. The DLC may comprise diamond like structures and/or amorphous carbon and hydrocarbon structures containing mixed sp2 and sp3 bonds.

In a particular embodiment the small particles are in the size range of approximately 10-500 nm, and have a particular aspect ratio of at least 5 and have a general rod shape. The small particles are chosen from the group consisting of Al2O3, AlN, MgO, ZnO, BN, Si3N4, TiO2 SiC and SiO2 with mixed stoichiometric and non-stoichiometric combinations. In a particular embodiment the small particles are glass fibers that have been coated with the diamond like carbon coating and are broken into small particles. Alternatively the fibers may be Nomex or Kevlar are similar types of polymeric fiber, which normally would remain whole, but could be broken up to small particles.

In another particular embodiment small particles with the diamond like carbon coating are applied directly to an insulating paper. They may also, either in conjunction or separately, be mixed in with a resin. Multiple diamond like carbon coatings may be applied to the small particles.

In another embodiment the present invention provides for diamond like carbon coatings on small particles within a resin. The small particles are in the size range of approximately 1-1000 nm and a diamond like carbon coating is applied to them. The diamond like carbon coating is distributed over approximately 50-100% of the surface of the small particles, and the diamond like carbon coating is one micron or less in thickness. The small particles are evenly distributed through the resin, and the amount of the particles with the diamond like carbon coating to the resin amount comprises a ratio of between the 1:4 and 5:1 by weight.

Other difficulties with the prior art also exist, some of which will be apparent upon further reading.

BRIEF DESCRIPTION OF THE FIGURES

The invention is explained in more detail by way of example with reference to the following drawings.

DETAILED DESCRIPTION OF THE INVENTION

Figure 1:
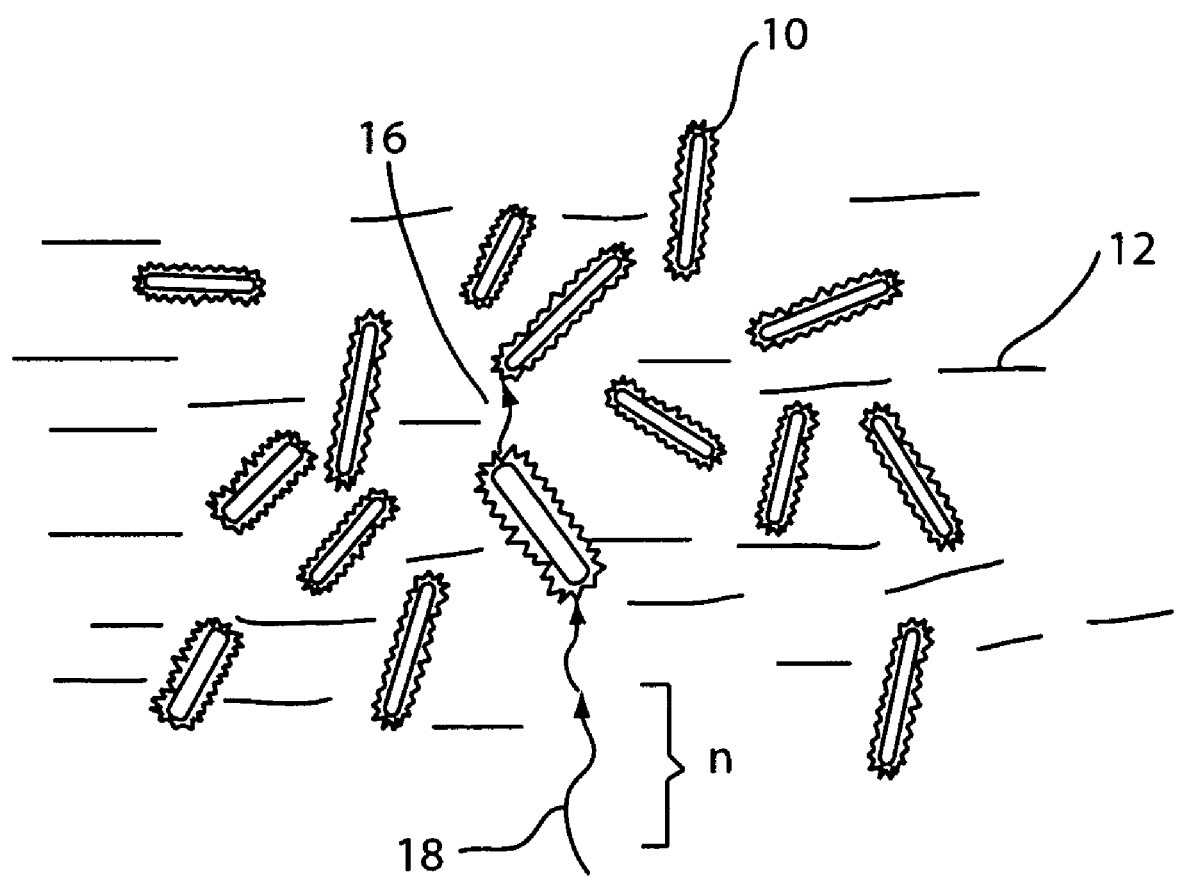
FIG. 1 illustrates one embodiment of the present invention where a diamond like carbon coating has been applied to rod-shaped small particles and dispersed within a resin.

The present invention applies diamond like carbon coatings (DLC) to nanofillers. As discussed below, nanofillers are small particles that are used to impregnate or surface coat a host material in order to change the physical properties of that host material. In some cases, however, the addition of plain nanofillers does not have a significant enough effect, or it is desirable to further increase the effect. This is particularly true for thermal conductivity.

Electrical insulators tend to be good thermal insulators, which is actually undesirable. By increasing thermal conductivity, the efficiency of the electrical system can be enhanced. The greater the thermal conductivity enhancement, the greater the efficiency of the system. It is also desirable to increase the thermal conductivity without impairing, and even improving upon, other physical properties, such as dielectric and physical strength.

The enhancement of the thermal conductivity of resin loaded insulating materials through the addition of a range of high thermal conductivity particles can be found in Smith Insulation Paper with High Thermal Conductivity Materials, and Compression of Resin Impregnated Insulating Tapes, both filed on Apr. 15, 2005, both of which are incorporated herein by reference. In general terms, those inventions cover the nanofillers that are incorporated into fiber and resin for components of products such as insulating tapes. The term nanofiller refers to particles having dimensions ~1-1000 nm. These may be spherical, platelets or have a high aspect ratio such as whiskers, rods or nanotubes, and their related assembled forms such as aggregates, fibrillar dendrites, ropes, bundles and nets and other forms. The nanofillers come from a range of materials, such as Al2O3, AlN, MgO, ZnO, BN, Si3N4, TiO2 SiC and SiO2 with mixed stoichiometric and non-stoichiometric combinations, and diamond particles. Silica is relatively inexpensive and plentiful, while TiO2 has a high permittivity.

The present invention incorporates the nanofillers discussed above, as well as others discussed below, and adds a diamond like carbon coating (DLC) to them. Though the nano particles themselves may be chosen for high thermal conductivity and other properties, the addition of a DLC will further enhance these features. In this embodiment the DLC has the desired properties of very high thermal conductivity, low electrical conductivity and very high dielectric strength. Therefore the particles to which the DLC is applied may be chosen for their own thermal conductivity, cost, connectivity or ease of orientation. Applying a DLC coating to particles of selected size or shape distribution enables one to select the particle parameters to suit the desired connectivity in the desired medium, and thereby increase the thermal properties of the material containing the particles. The particles to which the DLC is applied may be in any form, from nano to micro and above, and from spheroids and platelets to rods, tubes and whiskers, produced by processes such as chemical, physical or plasma deposition. DLC is formed within a non-equilibrium radio frequency or microwave coupled vacuum or atmospheric plasma containing low molecular weight hydrocarbons such as methane, ethane and others with hydrogen. By controlling the gas mixture condition and the plasma operating conditions the thermal conductivity of the DLCs may be controlled by altering the hybridization state of the DLC which may be controlled by changing the balance of sp2 and sp3 electron orbital bonding states which may be measured using Raman spectroscopy and X-ray photoelectron spectroscopy. In the case of vacuum plasma deposition batch processing may be achieved and in the case of atmospheric plasma deposition continuous processing may be used.

The properties of the DLC may be varied to achieve the required properties from the coated particles and hence from the loaded, material. One way of doing this when the DLC is applied by a plasma assisted chemical vapor deposition (PACVD) process is to vary the process parameters. Generally the host material may form a part of a composite material or multi-material structure with each component or system being enhanced.

Diamond-Like Carbon Coatings (DLC) have high hardness, low friction, chemical inertness, and can combine high electrical resistivity (~$10^{13}$ Ohm cm) for electrical insulation with high thermal conductivity (>1000 W/mK). As discussed, there are several methods for producing a DLC, such as plasma assisted chemical vapor deposition (PACVD), physical vapor deposition (PVD), and ion beam deposition (IBD). In general, the DLC is less than one micron thick and is of amorphous carbon and hydrocarbons which results in mixed sp2 and sp3 bonds. The bond ratio can be varied by varying the process parameters, for example the ratio of gases and DC voltage, with resultant changes in properties. The bond ratio can be directly measured using, for example, Raman spectroscopy.

Relatively large areas can be coated quite quickly. For example using a PACVD low pressure non equilibrium process a 20-100 nm coating can be applied to a glass cloth surface approximately 1 sq ft in area in minutes. To control or optimize the coating parameters to reduce, for example, the stress in the coating the DLC can be applied to a bare substrate or substrates that have other coatings. The DLC can be continuous or have gaps in the coverage. Gaps may be advantageous, for example, in allowing for better bonding of an impregnated resin.

In thermal conductivity, phonon transport is enhanced and phonon scattering reduced by ensuring the length scales of the structural elements are shorter than or commensurate with the phonon distribution responsible for thermal transport. Larger HTC particulate materials can actually increase phonon transport in their own right, however, smaller HTC materials can alter the nature of the host matrix, thereby affect a change on the phonon scattering. This may be further assisted by using nano-particles whose matrices are known to exhibit high thermal conductivity and to ensure that the particle size is sufficient to sustain this effect and also to satisfy the length scale requirements for reduced phonon scattering. It is also necessary to consider the choice of structures that are more highly ordered including reacted dendrimer lattices having both short and longer range periodicity and ladder or ordered network structures that may be formed from matrices.

Applying a DLC to particles of nano, meso, micro and larger dimensions enables the size and shape of the high thermal conductivity particles to be engineered, so benefit can be obtained from percolation effects occurring naturally or created. In one example a DLC is applied to quasi-continuously coat the surface of a glass fiber or number of fibers. The surface of the fiber before coating is chosen to promote the desired properties from the coating. The fiber is then broken up by mechanical or other means into short DLC coated rods of the desired dimensional distribution. In another example a DLC coating is applied to flake-shaped particles having a high surface to thickness ratio, mica flakelets and BN particles being examples.

In poly-crystalline and mono-crystalline nano-particulate form, the particles may associate with the surface of a carrier particle, eg silica. Silica by itself is not a strong thermally conducting material, but with the addition of a surface coating it may become more highly thermally conducting. Silica and other such materials, however, have beneficial properties such as being readily formed into rod-shaped particles, as discussed above. In this manner, various HTC properties can be combined into one product. These coatings may also have application to the latter resin impregnation and to the glass components of the insulating tape.

The uses of DLC coated nano particles can be varied. As discussed, in some applications they can enhance thermal, mechanical and electrical properties. The present invention has particular utility when used in electrical insulation systems. Particular applications include having DLC on nanofillers incorporated into resins. These resins can then be impregnated into a host matrix or used as coatings as is practiced in the art. Additionally, the DLC on nanofillers can also be incorporated directly onto the host matrixes.

For example, the DLC nanofillers can be put onto a mica paper during or after the mica paper manufacture. To add the DLC coated nanofillers in the aqueous mica slurry stage the fillers may either be added as a powder or as a suspension in a liquid phase. Typically in the latter instance the liquid could be water. The water could have a variety of chemical compositions i.e. it could be deionized, demineralized, or have additives to control its pH value. To add DLC coated nanofillers into the mica paper the fillers may be incorporated into a suitable solvent as a suspension in the solvent. Examples are typical organic solvents such as hexane, toluene, MEK etc. Further the liquid could be a solvent containing one or more accelerators which may be used to accelerate the reaction of impregnation resins, and or be a micabond resin(s).

Fibers are sometimes included into mica paper to enhance the cohesive and tensile properties. DLC on fibers can fulfill the same purpose while improving the thermal conductivity of the mica paper medium on its impregnation with resin via a GVPI or VPI process or in Resin Rich tape manufacturing process.

In one embodiment the surface coating of nano, meso and micro inorganic fillers having the desired shape and size distribution and the selected surface characteristics and bulk filler properties are complimentary to each other. This enables better percolation of the host matrix and independent interconnection properties are controlled independently while maintaining required bulk properties, such as mechanical strength, electrical strength, thermal capability.

In regards to shape, the present invention utilizes shapes tending towards natural rods and platelets for enhanced percolation in the host matrix with rods being the most preferred embodiment including synthetically processed materials in addition to those naturally formed. A rod is defined as a particle with a mean aspect ratio of approximately 5 or greater, with particular embodiments of 10 or greater, though with more particular embodiments of no greater than 100. In one embodiment, the axial length of the rods is approximately in the range 10 nm to 100 microns. Smaller rods will percolate a host matrix better when added to a finished host matrix using a solvent.

Many micro particles form spheroidal, ellipsoidal and discoidal shapes, which have reduced ability to distribute evenly under certain conditions and so may lead to aggregated filamentary structures that reduce the concentration at which percolation occurs. By increasing the percolation, the thermal properties of the substrate can be increased, or alternately, the amount of HTC material that needs to be added to the substrate can be reduced. Also, the enhanced percolation results in a more uniform distribution of the HTC materials within the substrate rather than agglomeration which is to be avoided, creating a more homogenous product that is less likely to have undesired interfaces, incomplete particle wetting and micro-void formation. Likewise aggregated filamentary or dendritic structures, rather than globular (dense) aggregates or agglomerates, formed from higher aspect ratio particles confer enhanced thermal conductivity.

Referring to FIG. 1, one embodiment of the present invention is shown. Here, small particles in the shape of nano sized rods 10 with a DLC are dispersed in a resin matrix 12. Phonons 16, with a path length n 18, will tend to pass along the rods with less scattering, thereby increasing thermal conductivity of the impregnated resin.

Although not shown here, the small particles may be of a variety of shapes and sizes used in the same application. Similarly, small particles used as nanofiller in this or other applications can be mixed with small particles that do not have a DLC coating, forming a heterogeneous mixture of small particles. Likewise different types, sizes, or morphologies of DLC coated particle may be used with or without particles that do not have a DLC coating.

In one embodiment the present invention provides for a diamond like carbon coating on small particles. This comprises small particles in the size range of approximately 1-1000 nm and a diamond like coating on the small particles. The diamond like carbon coating is distributed over approximately 50-100% of the surface of the small particles and the diamond like carbon coating is typically one micron or less in thickness. The DLC may comprise diamond like structures and/or amorphous carbon and hydrocarbon structures containing mixed sp2 and sp3 bonds.

In a particular embodiment the small particles are in the size range of approximately 10-500 nm, and have a particular aspect ratio of at least 5 and have a general rod shape. The small particles are chosen from the group consisting of Al2O3, AlN, MgO, ZnO, BN, Si3N4, TiO2 SiC and SiO2 with mixed stoichiometric and non-stoichiometric combinations. In a particular embodiment the small particles are fabric fibers that have been coated with the diamond like coating and are broken into small particles.

In another particular embodiment small particles with the diamond like carbon coating are applied directly to an insulating paper, which may also be made of glass fiber or cloth. They may also, either in conjunction or separately, be mixed in with a resin. Multiple diamond like coatings may be applied to the small particles.

In another embodiment the present invention provides for diamond like carbon coatings on small particles within a resin. The small particles are in the size range of approximately 1-1000 nm and a diamond like carbon coating is applied to them. The diamond like carbon coating is distributed over approximately 50-100% of the surface of the small particles, and the diamond like coating is one micron or less in thickness. The small particles are evenly distributed through the resin, and the amount of the particles with the diamond like carbon coating to the resin comprises a ratio of between the 1:20 and 5:1 by weight, with more particular ranges of 1:3 and 3:1.

In particular embodiments the resin is a liquid crystal thermoset. In another particular embodiment the resin with the small particles is impregnated into an insulating tape.

In still another embodiment the present invention provides for diamond like carbon coatings on small particles within a resin impregnated insulating tape. This comprises small particles in the size range of approximately 1-1000 nm and a diamond like carbon coating on the small particles. The diamond like carbon coating is distributed over approximately 50-100% of the surface of the small particles and the diamond like carbon coating is one micron or less in thickness. The small particles are evenly distributed through the resin and the amount of the particles with the diamond like carbon coating to the resin comprises a ratio of between the 1:20 and 5:1 by weight. The resin with the small particles is then impregnated into an insulating tape.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the inventions which, is to be given the full breadth of the claims appended and any and all equivalents thereof.

What is claimed is:

1. A composition comprising DLC coated particles and a resin comprising:
   small particles in the size range of approximately 1-1000 nm in their largest dimension; and
   a diamond like carbon coating on said small particles;
   wherein said diamond like carbon coating is distributed over approximately 50-100% of the surface of said small particles;
   wherein said diamond like carbon coating is one micron or less in thickness;
   wherein said small particles with said diamond like carbon coating are mixed in with said resin;
   wherein said particles are immersed in and evenly distributed through said resin.

2. The composition of claim 1, wherein said small particles are in the size range of approximately 10-500 nm.

3. The composition of claim 1, wherein said small particles have an aspect ratio of at least 5.

4. The composition of claim 1, wherein said small particles have a general rod shape.

5. The composition of claim 1, wherein said small particles are chosen from the group consisting of Al2O3, AlN, MgO, ZnO, BN, Si3N4, TiO2 SiC and SiO2 with mixed stoichiometric and non-stoichiometric combinations.

6. The composition of claim 1, wherein said small particles are fibers that have been coated with said diamond like carbon coating and broken into small particles.

7. The composition of claim 1, wherein said composition are applied directly to an electrically insulating paper.

8. The composition of claim 1, wherein said DLC is of amorphous carbon and hydrocarbons structures containing mixed sp2 and sp3 bonds.

9. The composition coating of claim 1, wherein multiple diamond like carbon coatings are applied to said small particles.

10. A composition comprising DLC coated particles and a resin comprising:
    small particles in the size range of approximately 1-1000 nm; and
    a diamond like carbon coating on said small particles;
    wherein said diamond like carbon coating is distributed over approximately 50-100% of the surface of said small particles;
    wherein said diamond like carbon coating is one micron or less in thickness;
    wherein said small particles are evenly distributed through said resin;
    wherein the amount of said particles with said diamond like carbon coating to said resin comprises a ratio of between said 1:20 and 5:1 by weight;
    wherein said particles are immersed in evenly distributed through said resin.

11. The composition of claim 10, wherein said resin is a liquid crystal thermoset.

12. The composition of claim 10, wherein said resin with said small particles is impregnated into an electrically insulating tape.

13. An article comprising a composition impregnated into an electrically insulating tape, wherein said composition comprises diamond-like carbon coated small particles and a resin, comprising:
    small particles in the size range of approximately 1-1000 nm in their largest dimension; and
    a diamond like carbon coating on said small particles;
    wherein said diamond like carbon coating is distributed over approximately 50-100% of the surface of said small particles;
    wherein said diamond like carbon coating is one micron or less in thickness;
    wherein said small particles are immersed in and evenly distributed through said resin;
    wherein the amount of said particles with, said diamond like carbon coating to said resin comprises a ratio of between said 1:3 and 3:1 by weight;
    wherein said resin with said small particles is impregnated into an electrically insulating tape.

* * * * *